ACOUSTIC LIGHT MODULATOR AND VARIABLE DELAY DEVICE

Filed May 2, 1966 3 Sheets-Sheet 1

INVENTOR
E. I. GORDON
BY Wilford L. Wisner
ATTORNEY

ACOUSTIC LIGHT MODULATOR AND VARIABLE DELAY DEVICE

Filed May 2, 1966 3 Sheets-Sheet 2

United States Patent Office 3,462,603
Patented Aug. 19, 1969

3,462,603
ACOUSTIC LIGHT MODULATOR AND VARIABLE DELAY DEVICE

Eugene I. Gordon, Convent Station, N.J., assignor to Bell Telephone Laboratories, Incorporated, New York, N.Y., a corporation of New York Filed May 2, 1966, Ser. No. 546,796
Int. Cl. H04b *9/00;* G02f *1/26, 1/28*
U.S. Cl. 250—199 8 Claims

ABSTRACT OF THE DISCLOSURE

An acoustic light modulator employing two input beams that intersect in the active medium so that the scattered light, resulting from the interaction between one of the beams and an acoustic wave in the active medium is substantially aligned with unscattered light from the other beam. A suitably disposed photo-detector will thus receive both scattered light, which is shifted in frequency, and unscattered, unshifted light. The advantage of this device is that the center frequency of the modulating acoustic wave is retained as the beat frequency between the scattered and unscattered beams and that a greater degree of amplitude modulation is obtained. A time-multiplexed multiple channel communication system is also disclosed.

This invention relates to acoustic light modulators and to the employment of such modulators as variable delay devices.

In an acoustic light modulator, a density wave propagating in a suitable medium modulates a light beam passing therethrough. The density wave may be excited in a variety of ways, including the propagation into the medium of microwave electromagnetic fields, as disclosed in my copending application, Ser. No. 377,353, filed June 23, 1964, and assigned to the assignee hereof. Regardless of the means of excitation, the density wave will be hereafter termed an acoustic wave.

Heretofore such acoustic light modulators have been limited in the degree of modulation obtainable without appreciable distortion. As a practical matter the degree of modulation, on an amplitude basis, presently cannot be increased much above ten percent without encountering appreciable nonlinearity or distortion in the modulating interaction; this limitation is a characteristic common to most light modulators.

Also, the ultimate detection and reception of the light beam yields only the modulation envelope of the acoustic signal. In fact, the acoustic carrier frequency is completely absent from the modulated light beam. This result can be appreciated by considering that an unmodulated acoustic wave (a pure sine-wave form) produces a constant amplitude, scattered light beam whose frequency is equal to the sum or difference of the incident light frequency and the acoustic frequency. More generally, the acoustic center frequency determines the angle of scattering of the light but is not itself preserved in the modulation process. This loss of the acoustic center frequency, or carrier frequency, is a serious handicap to the employment of acoustic light modulators in certain types of communication systems, for example F-M systems in which only the frequency of the transmitted signal is varied.

As another example, acoustic light modulators can be employed in time multiplexing of a plurality of communication signals, since the variable delay that can be introduced between the transducing of the signal to an acoustic wave and the modulating of the light permits one to align timewise the information packets or portions from the various signals so that they do not overlap. Nevertheless, the loss of the acoustic center frequency in the multiplexing process may necessitate the introduction of a new carrier frequency for the multiplexed signal in order to make transmission feasible.

It is one object of my present invention to provide acoustic light modulation at a greater degree of modulation than the prior art without increased distortion.

It is a coordinate object of my invention to provide or preserve an appropriate signal center frequency in the modulation process.

According to my invention, an acoustic light modulator employs two input light beams that intersect in the modulating region of the active medium so that the scattered light, resulting from interaction with the acoustic wave, from one is substantially aligned with unscattered light from the other. A suitably disposed photo-detector will thus receive both scattered light, which is shifted in frequency, and unscattered light, which is not shifted in frequency. Both components have amplitude modulation. The photo-detector will detect not only the modulation envelope but also the principal beat frequency of the scattered light with respect to the unscattered light. In most of the embodiments, this beat frequency is the center frequency, or carrier frequency, of the modulated acoustic wave. This frequency is also the original center frequency, or carrier frequency, of the input signal. In the other embodiments, the beat frequency is related to the center frequency of the acoustic wave and still provides a carrier frequency for the output signal from the photo-detector.

Thus, one distinct advantage of the present invention is that the signal center frequency is preserved, or an appropriate one is provided, in the modulation process.

Another distinct advantage of the invention is that the beat frequency has a much greater degree of modulation than either the scattered light or the unscattered light. This fact may be appreciated from the following simple mathematical analysis. The fraction of the energy of an incident light beam that is scattered without substantial distortion is $\eta$, which is proportional to the acoustic power. In actual fact, the scattered light power is described by $\sin^2 \eta^{1/2}$ which approximates $\eta$ only when $\eta \leq 0.1$. Consequently only when the scattered power is considerably less than the incident power. The amplitude of the transmitted or unscattered beam is $\cos \eta^{1/2}$. The maximum positive or negative peaks of the beat frequency occur when the maximum amplitudes of both the scattered and unscattered light propagating in a given direction occur simultaneously in the same sense at the same place. Similarly, the minimum positive or negative peaks of the beat frequency occur when the minimum amplitude of the unscattered light occurs in one sense and the maximum amplitude of the scattered light occurs in the opposite sense. Following these principles, we can write the maximum peak electric field of the beat frequency as:

$$E_{B+} = (\cos \eta^{1/2} + \sin \eta^{1/2})E_0 \quad (1)$$

and the minimum peak electric field of the beat frequency as:

$$E_{B-} = (\cos \eta^{1/2} - \sin \eta^{1/2})E_0 \quad (2)$$

where $E_0$ is the output peak electric field of either light beam in the absence of the acoustic wave.

The degree of modulation of the beat frequency detected by a conventional square law photo-detector is $$\eta_B = \frac{E_{B+}^2 - E_{B-}^2}{E_{B+}^2} = \frac{2 \sin 2\eta^{1/2}}{(\cos \eta^{1/2} + \sin \eta^{1/2})^2} \approx \frac{4\eta^{1/2}}{1 + 2\eta^{1/2}} \quad (3)$$

A numerical example will serve to illustrate the improvement obtained in the degree of modulation. As a practical matter the modulation depth is $\eta=0.1$ for a substantially linear modulation when only a single light beam is employed. From Equation 3 the same value of $\eta$ allows a linear modulation depth of 0.8 when two beams are employed.

A further advantage of the present invention, in addition to preservation of acoustic center frequency and a greater degree of modulation, is that the variable delay obtainable in such a modulator facilitates its use in a variety of systems, such as a system employing time multiplexing of communication signals with time compression or a chirp radar system.

Further features and advantages of the present invention will become apparent from the following detailed description, taken in conjunction with the drawing, in which.

Figure 1:
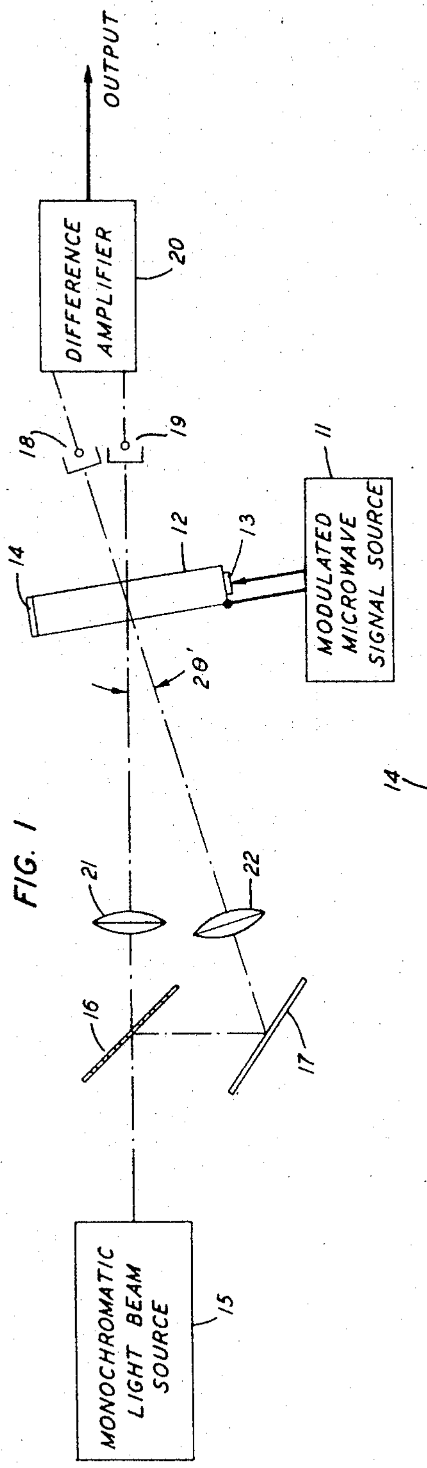
FIG. 1 is a partially pictorial and partially block diagrammatic illustration of a preferred embodiment of the invention.

In FIG. 1 a microwave source 11 supplies a modulated signal to be employed to modulate monochromatic light according to the present invention. The modulated microwave signal is applied through a conventional electro-acoustic transducer 13 to one end of an appropriate medium 12, capable of supporting acoustic waves. The transducer 13 has a width in the plane of the light beams that is appropriate for providing a diffraction angle of the acoustic beam that corresponds to a selected efficiency of the scattering interaction, as will be explained hereinafter. Attached to the opposite end of the medium 12 is an absorbing termination 14, such as hard rubber, which absorbs the acoustic waves at the opposite end of medium 12 in order to prevent unwanted reflections. A source 15 supplies the monochromatic light that is to be modulated. Source 15 typically includes means for forming the light into a well-defined beam. The beam is then split into two equal-intensity components by the partially reflective surface 16; and the reflector 17 directs the reflected beam so that the two beams intersect at an appropriate angle with respect to one another in the medium 12. While equal intensities of the two beams are preferred, they are not required. Also, while equal frequencies and phase coherence of the two beams are preferred, it is sufficient that the two beams are phase coherent, where phase coherence in this case means that the output beat-frequency wave has a predictable phase. Lenses 21 and 22 provide diffraction angles of the light beams to achieve the selected bandwidth of the scattering interaction.

Preferably the components of FIG. 1 are oriented with respect to one another so that both beams pass through medium 12 substantially at the so-called Bragg angle but on opposite sides of the normal to the surface of medium 12 upon which they are incident. Thus, the two beams intersect at an angle, $2\theta'$, which is related by refraction to twice the Bragg angle in the medium. The plane defined by the intersection of the two beams must also contain the acoustic beam. As will be more fully discussed hereinafter, the light scattered from one of the beams by the modulated acoustic wave propagates substantially in line with the unscattered light of the other beam. Suitable photo-detectors 18 and 19 are disposed to receive the two principal light beams emanating from the medium 12. The outputs of source detectors 18 and 19 are connected in appropriate phase to a differential amplifier 20 to provide the maximum output signal.

The source 11 may be any one of a number of devices, for example, a crystal-controlled oscillator or a voltage-tunable oscillator, to which has been applied a communication signal in order to amplitude modulate the output oscillations of the oscillator.

The medium 12 is typically a crystal of an electro-optic material, such as potassium tantalate niobate (KTN), or photo-elastic material, such as lithium niobate $(LiNbO_3)$ Although KTN generally produces a quadratic electro-optic effect, a substantially linear effect may be obtained with direct-current biasing means, which are not shown because they are well-known in the art. Many other suitable electro-optic materials provide a linear electro-optic effect without bias. Lithium niobate provides a large photo-elastic effect. The faces of the crystal 12 through which the light beams enter and exit are ground to be flat and parallel and are antireflection coated with suitable dielectric materials. The materials and techniques of such anti-reflection coatings are now well known in the optical art. The transducer 13 is a piezoelectric thin film of cadmium sulfide or zinc oxide.

As is known the microwave signal from source 11 is typically applied to the transducer 13 through a coaxial cable (not shown), the center conductor of which is attached to the piezoelectric thin film and the outer conductor of which is attached to a metallic film (not shown) that bonds the piezoelectric thin film to the crystal 12 and forms an interface therewith. A variety of other methods of applying the signal to transducer 13 are also possible. When the crystal 12 is KTN, for example, other means for injecting microwave energy include that described by M. G. Cohen and E. I. Gordon "Electro-optic Gratings for Light Beam Modulation and Deflection," Applied Physics Letters, vol. 5, pp. 181–182, Nov. 1, 1964.

The monochromatic light source 15 may be any one of a number or devices, but is preferably an optical maser because of the spatial coherence and brightness of the light output of such devices. Nevertheless, the source 15 could also be an incoherent source of substantial brightness after filtering to have a relatively narrow band of frequencies. In particular, a narrow band of frequencies instead of a single frequency may be employed if the frequency range of the modulated microwave signal from source 11 falls outside the band of frequencies supplied by source 15.

The beam-splitting reflector 16 may be a thin metallic or dielectric film of the type well known in the art or a grid of the type described in the copending application of C. G. B. Garrett, Ser. No. 510,655, filed No. 30, 1965 and assigned to the assignee hereof. Reflector 17 is a conventional mirror suitable for the wavelength of light from the monochromatic source 15.

The photo-detectors 18 and 19 are conventional photo-detectors suitable for the wavelength of the monochromatic light from source 15. The difference amplifier 20 is also conventional. It may be readily seen that, in order to obtain the maximum output of difference amplifier 20, the photo-detectors 18 and 19 are connected to its inputs so that their output signals are substantially 180 degrees out of phase with respect to one another. Amplitude modulation signals of the light from source 15, such as caused by beating of laser modes are thereby cancelled. Alternatively, only one output photo-detector need be used inasmuch as all of the essential advantages of the invention are still obtained thereby, although at somewhat reduced output signal level and sensitivity and without the cancellation of spurious A-M signals on the light.

In the operation of the embodiment of FIG. 1, the modulated acoustic wave propagates in a direction perpendicular to the bisector of the angle made by the two light beams and in the plane defined by the beams. The angle $\Theta$ measured in the acoustic medium is chosen to correspond to the Bragg angle for the center frequency of interest:

$$\sin \Theta \approx \frac{1}{2}\frac{\lambda}{\Lambda} = \frac{1}{2}\frac{\Omega_0}{\omega}\frac{c'}{v} \qquad (4)$$

in which:

$\Lambda$=acoustic wavelength
$\lambda$=light wavelength in the medium
$\Omega_0$=acoustic radian frequency at center band, and
$\omega$=optical radian frequency at center band
$c'$=velocity of light in the medium
$v$=velocity of acoustic wave.

At the Bragg angle the maximum scattering interaction of the acoustic beam with the light beams is obtained.

The external angle $2\Theta'$ between the light beam is related to $\Theta$ inside the medium according to the law of refraction.

After passing through the crystal 12 and interacting with the acoustic wave, each one of the emerging light beams consists of the original light beam incident in substantially that direction plus a component of light scattered from the other incident beam and now moving in the said direction. The scattered light is up-shifted or down-shifted in frequency by the acoustic frequency. Of course, the unscattered light has not been shifted in frequency. The scattering of a component of each of the incident beams is a result of interaction with the acoustic wave within crystal 12; and the basic theory of such an interaction is now well understood in the art.

An important factor of the present invention is that at least part of the scattered light is propagating in substantially the same direction as unscattered light of a different frequency. Thus, a photo-detector 18, for example, disposed to intercept scattered light as well as unscattered light will detect a beat in the usual heterodyne manner; and this beat will have the same frequency and the same modulation characteristics as the signal from source 11 delayed by the acoustic transit time. The preservation of the original frequency characteristics of the modulated microwave signal is due to the fact that the frequency difference between the scattered and unscattered light is precisely the acoustic frequency, which is the microwave frequency.

As illustrated by the numerical example in the introduction above, the modulation signal detected by just one of the photo-detectors 18 and 19 is significantly greater than that which would be detected if the one photo-detector received only scattered or unscattered light.

The bandwidth of the embodiment of FIG. 1 is limited by the slight deflection of the scattered light as the acoustic frequency varies, so that the scattered light overlaps only partly the unscattered light of the other beam. It should be noted that both beams spread according to the laws of diffraction as they propagate. If the incident light beam has an angle of diffraction $$\Delta\theta \approx \frac{\lambda}{w} \qquad (5)$$

in which $w$ is its width; and the angle of scattering is $$\theta_s \approx \frac{f_0\lambda}{v} \qquad (6)$$

in which $f_0=\Omega/2\pi$ then the bandwidth $\Delta f$ is defined by $$\frac{\Delta f}{f_0} = \frac{\Delta\theta}{\theta_s} \approx \frac{v}{wf_0} \qquad (7)$$

or $$\Delta f \approx \frac{v}{w} = \frac{1}{\tau} \qquad (8)$$

in which $\tau$ is the transient time of the sound through the light. Thus, to achieve large bandwidth, it is advantageous to focus the light strongly so that it has a sufficiently small transverse dimension through which the sound passes. For example, if the light beam diameter is $100\mu$ (0.1 millimeter) the bandwidth is 60 megacycles per second, for the case in which the acoustic velocity $v$ is $6\times10^5$ centimeters per second.

It can be shown that the amplitude of the detector signal at the acoustic frequency for a given acoustic power varies as $Erf(a)/a^{1/2}$ in which $Erf$ is the well known error function and the parameter $a$ equals the ratio of the light diffraction angle to the diffraction angle of the acoustic beam. This relationship and the bandwith relationship have been verified experimentally, employing the embodiment of FIG. 2, by varying the diffraction angle of the acoustic beam and the diffraction angle of the light, respectively.

Since $Erf(a)/a^{1/2}$ is zero for $a=0$ and $a=\infty$ and has a maximum for $a=0.99$, optimum design for the modulator requires that the transducer 13 be adapted to provide a width of the waist of the acoustic beam L satisfying the relationship $$\frac{L}{\Lambda} \approx \frac{w}{\lambda} \qquad (9)$$

The transducer 13 in the embodiment of FIG. 1 has a width equal to L and is planar. Nevertheless, a curved transducer might be employed to provide the appropriate diffraction angle of the acoustic beam by focusing it so that the beam waist has the width L.

It will be noted that to obtain the improved modulation effect provided by the embodiment of FIG. 1, it is desirable that the phase relationships between the two incident beams remain substantially fixed. This can be done provided the beam splitter 16 and reflector 17 can be sufficiently isolated from vibrational and thermal disturbances. In an enviroment in which the beam splitter cannot be well protected from such disturbances. it is desirable to provide that the disturbances have substantially the same effect upon the optical path length of both the incident beams. An embodiment employing a symmetrically arranged beam splitter to achieve such equal variations of the optical path lengths in response to disturbances illustrated in FIG. 2.

Figure 2:
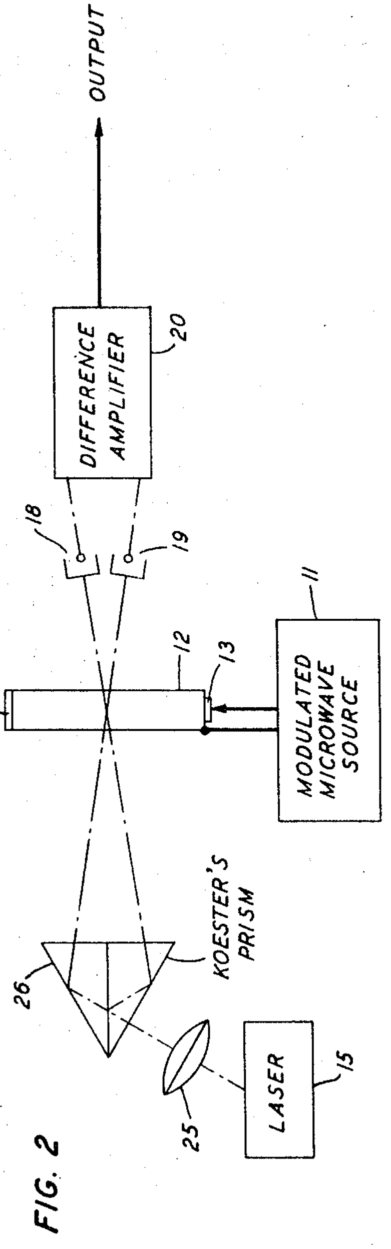
FIG. 2 is a partially pictorial and partially block diagrammatic illustration of another embodiment of the invention adapted to compensate for disturbances of the light-beam directing apparatus.

The embodiment of FIG. 2 is substantially the same in all details as the embodiment of FIG. 1 and employs like components with the exception that the beam splitting and directing arrangement of FIG. 1 has been replaced by the prism 26 and the converging lens 25. The prism 26 is a so-called Koester's double image prism of the type well known in the optical art. The construction and advantages of such a prism as a beam splitting element are described by John Strong in Concepts of Classical Optics, by W. H. Freeman and Company, 1958, at pp. 393–395. It is relatively free from vibration effects, easy to adjust and compact. Moreover, for purposes of the present invention it compensates the beam path length with respect to changes in temperature, as well as compensating for vibrations. Rotating the prism about an axis normal to the paper adjusts the angle between the two beams to achieve the proper value of $2\Theta'$. The converging lens 25 then provides the appropriate diffraction angles of both beams to achieve the selected bandwidth.

The operation of the embodiment of FIG. 2 is substantially the same as that of the embodiment of FIG. 1.

Whereas the embodiment of FIG. 2 is advantageous with respect to compensation for vibration and temperature variations, yielding a more stable output, the embodiment of FIG. 1 has the advantage of being more readily adapted to achieve variable delay of the signal. The experimental verification of control over bandwidth and efficiency of the scattering interaction was provided by employing the embodiment of FIG. 2 in the following manner. First, to demonstrate the correlation between the diffraction angles of the light beams and the bandwidth of the modulator, as measured at the output of either photo-detector 18 or 19, several different lenses 25 were employed. For each lens 25 the acoustic frequency from source 11 was varied, and the Koester's double image prism 26 was tilted slightly in order to provide the optimum angle between the two beams in the medium 12 in order to satisfy the Bragg relationship. The response of either photo-detector as a function of acoustic frequency then revealed the bandwidth of the modulator for that lens 25. It was found that the bandwidth increases with the diffraction angle of the light which was the same for both light beams. This relationship was predicted in Equation 7 above.

Then for a fixed lens 25, the width of the transducer 13 was varied in order to vary the diffraction angle of the acoustic beam. It was found that the maximum strength of the scattering interaction was obtained when the diffraction angle of the acoustic beam was approximately equal to the diffraction angles of the light beams. This result substantially verifies the 0.99 ratio predicted above (ratio of diffraction angle of the light beam to diffraction angle of the acoustic beam).

Figures 3, 5, 6:
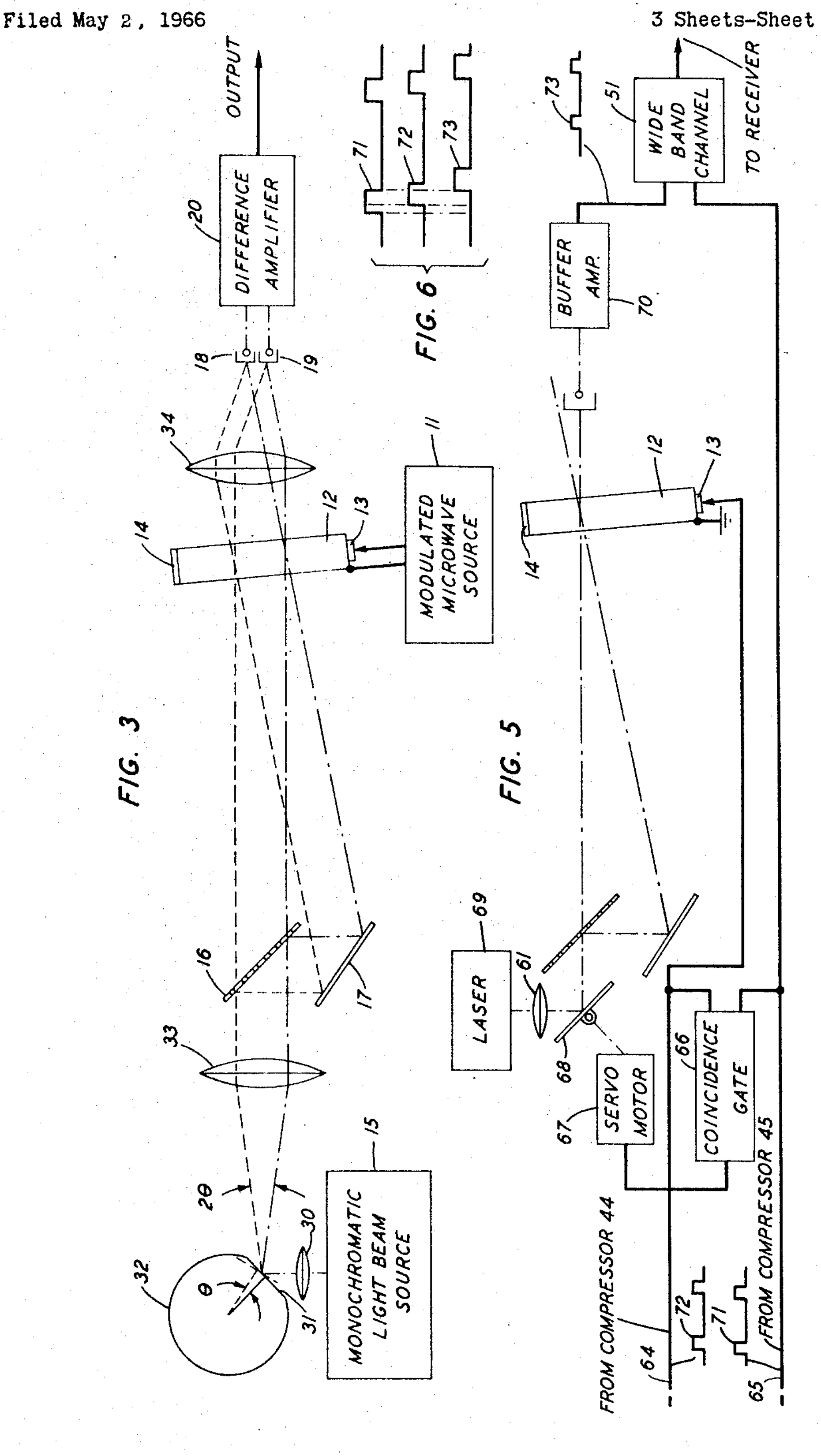
FIG. 3 illustrates a modification of the embodiment of FIG. 1 to provide a linearly-variable signal delay.
FIG. 5 is a partially pictorial and partially block diagrammatic showing of another embodiment of the invention employed as the multiplexer in the system illustrated in FIG. 4.
FIG. 6 shows curves illustrating the time relationships between signals in the embodiment of FIG. 5.

In FIG. 3 there is shown a modfication of the embodiment of FIG. 1 which is adapted to achieve a variable delay of the modulated microwave signal applied by source 11. Components that are substantially the same as those of FIG. 1 are labeled with the same numbers as in FIG. 1.

The embodiment of FIG. 3 includes as the pricinpal modification of the embodiment of FIG. 1 an arrangement such that the monochromatic light beam from source 15 is reflected from an appropriately shaped reflecting surface 31 of a cam 32 through a converging lens 33. This arrangement renders parallel the propagation directions of all of the possible light beams that can be directed through it from surface 31. After passage through lens 33 the light beam is split by the beam splitter 16, and the reflected component is redirected by reflector 17 as in the embodiment of FIG. 1. In order that each modulated beam, as it is deflected in response to the rotation of cam 32, may always arrive at the same one of photo-detectors 18 and 19, another converging lens 34 is disposed between crystals 12 and photo-detectors 18 and 19 to focus parallel rays from the appropriate direction upon the appropriate photo-detector. Thus, the spacing of lens 34 from photo-detectors 18 and 19 is substantially equal to its focal length. Similarly, lens 33 is disposed substantially at its focal length from the reflective surface 31 of cam 32.

A lens 30 preceding cam 32 provides the appropriate diffraction angles for the light beams in the medium 12. The transducer 13 is adapted to provide a diffraction angle for the acoustic beam that is nearly equal to the diffraction angles of the light beams.

In the operation of the embodiment of FIG. 3, an unusual and advantageous characteristic is that the two beams will continue to intersect upon the line defining the center of the acoustic beam, provided this is true for the initial position, regardless of changes in the position of cam 32.

The delay of the modulated signal from source 11 from the time of its introduction through transducer 13 to the time of its interaction with the crossed light beams can be varied by rotating the cam 32 to deflect the single light beam reflected from surface 31. An initial position of the light beam is indicated by the dot-dash line; whereas a deflected position is indicated by the dashed line. For rotation of the cam 32 through an angle $\theta$, the light beam is deflected through an angle $2\theta$; and the displacement of the point of interaction of the split light beams along the direction of propagation of the acoustic wave is, to a first approximation, linearly proportional to the size of the angle $2\theta$.

It follows that if the angle $\theta$ is varied linearly with respect to time, i.e., the cam 32 is rotated at constant velocity, the point of interaction of split light beams, will move at substantially constant velocity through crystal 12 and will linearly vary the delay presented to the input signal from source 11.

Figure 4:
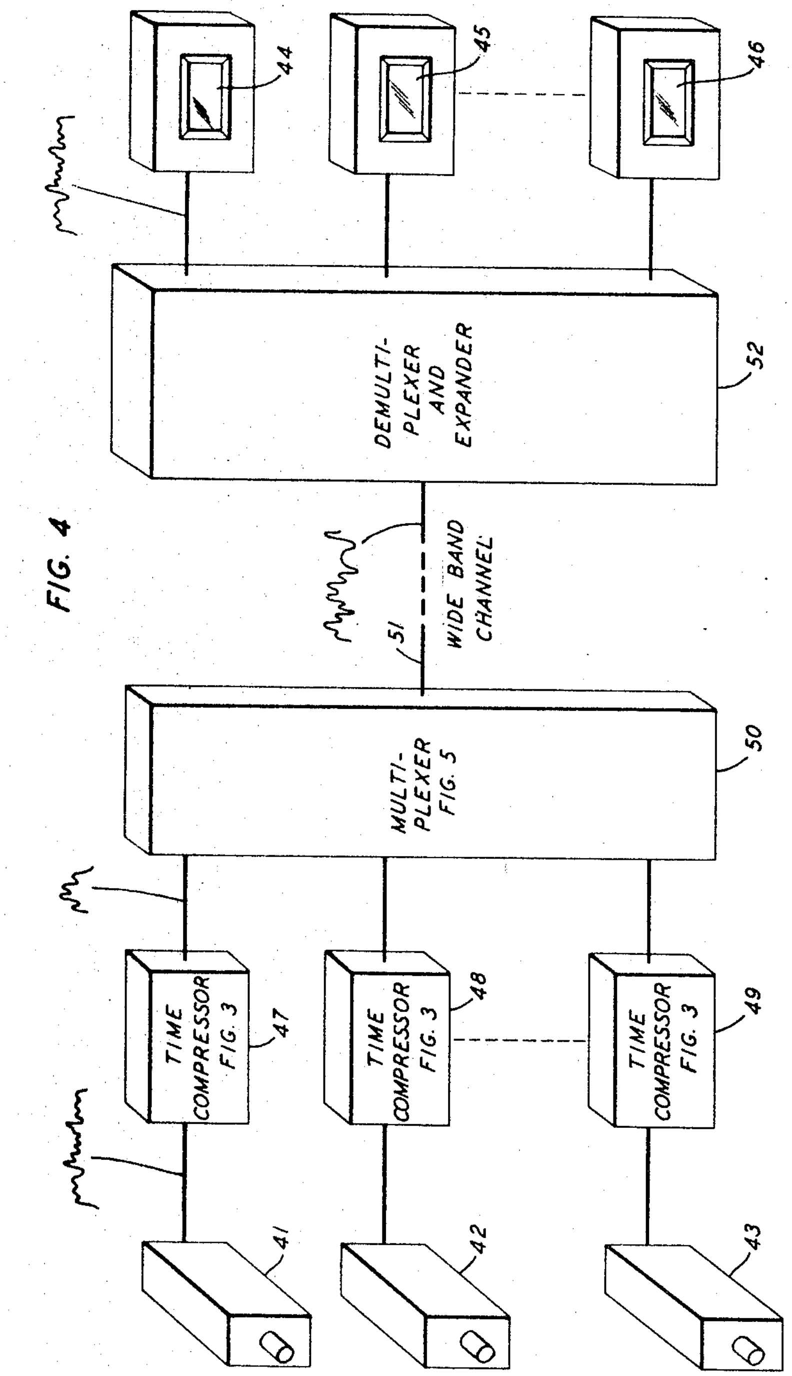
FIG. 4 is a block diagrammatic illustration of a time-multiplexed multiple-channel communication system employing the present invention.

One application of such a variable-delay modulator is as an apparatus for compressing the time scale of an information signal to permit it to be interleaved with other similar signals for transmission over a common broadband communication line without loss of information and without intermodulation of the different signals. This technique of time-multiplexing communication signals is disclosed in the abandoned patent application of J. S. Mayo, Ser. No. 431,311, filed Feb. 9, 1965 and assigned to the assignee hereof. A block diagram of such a system employing the variable delay modulator of FIG. 3 as a time compressor and also as the interleaving apparatus, or multiplexer, is shown in FIG. 4 and will be described hereinafter.

To appreciate how the modulator and variable delay device shown in FIG. 3 can achieve time compression of the input signal, consider the following sequence of events. First, let cam 32 rotate clockwise so that once during each cycle the intersection of the split light beams is swept from the vicinity of absorbing termination 14 to the vicinity of transducer 13. As described above, this sweep is accomplished at substantially constant velocity. Now let the speed of the cam 32 be such that the period of one complete rotation of the cam is equal to the transit time of the acoustic wave from transducer 13 to termination 14. From this condition, it should be immediately apparent that no information in the signal from source 11 can be lost because every single portion of the acoustic wave must interact with the intersecting light beams at some point in its passage through crystal 12. Nevertheless, because the reflecting surface 31 occupies only a fraction of the perimeter of cam 32, all of the information carried by the acoustic wave must be read out to the photo-detectors 18 and 19 in a fraction of the transit time of any portion of the acoustic wave through crystal 12.

For example, assume that the reflector 31 subtends an angle of 36° at the center of rotation of cam 32. The intersection of the light beams is then swept through the entire length of crystal 12 in one tenth the period of rotation of cam 32 to transfer all of the information contained throughout the length of crystal 12 to each of the photo-detectors 18 and 19; and then no further output is obtained until the portion of the acoustic wave that was already probed in the vicinity of transducer 13 has passed into termination 14. By this time, a new sample of the signal, continuous with the last one, is now stored throughout the length of crystal 12 and a new scan or sweep of the light beams throughout crystal 12 commences. It is thus seen that time compression of the signal from source 11, as desired for the system of the above-cited application of J. S. Mayo, is obtained at the output of either photodetector 18 or 19 or at the output of difference amplifier 20. Thus, 10 such output signals representing different communication signals, if properly aligned timewise, can be interleaved on a single communication line without time overlap and, consequently, without intermodulation.

Such a time compression process multiplies the bandwidth of the signal by K where $1/K$ is the fractional time that the signal appears at the output; and the center frequency of the signal is also multiplied by K. Although the center frequency is not strictly preserved, as in the embodiment of FIG. 1, the signal advantageously still has a center frequency in a practical range. That is, the center frequency corresponds to the carrier frequency of the transmission medium.

As an example of a multiplexed communication system employing such time compression arrangements, consider the system illustrated in FIG. 4. This system has substantially the same organization as that disclosed in the above-cited copending application of J. S. Mayo. Typically, the system might be a telephone communication system of the type known as the Picturephone system. The cameras 41, 42 and 43 at different subscriber station sets, not connected to one another, are employed to transmit subscriber images to the viewing screens 44, 45 and 46 of the subscriber station sets to which they are respectively connected. Frequently, many such unrelated communications propagate in the same direction between the same switching terminals during at least portions of their respective transmission paths. Accordingly, it is advantageous to multiplex them for combined transmission.

A typical Picturephone signal occupies a bandwidth of about 0.5 megacycles per second, whereas the broadband transmission lines, or trunks, over which they are transmitted have a usable bandwidth of about 5 megacycles per second. Thus, each signal can be compressed to occupy one tenth of its natural time and will thereby acquire a frequency band of 5 megacycles per second.

Illustratively the Picturephone signals from ten cameras such as cameras 41–43 apply their respective signals to ten compressors such as compressors 47, 48 and 49 which are arrangements as shown in the embodiment of FIG. 3. The respective cameras 41–43 correspond to the modulated signal source 11 in each case. The output signal of each time compressor is illustratively the output of a difference amplifier 20 like that of FIG. 3. The outputs of compressors 47–49 are connected to a multiplexer 50 which is constructed and operated as described hereinafter in connection with FIG. 5. The output of multiplexer 50 is applied to a wideband channel 51, i.e., a 5 megacycle bandwidth coaxial cable. At the receiving terminal, the multiplexed signals from channel 51 are applied to a demultiplexer and time expander arrangement 52, which can be that described in the above-cited copending application of J. S. Mayo or could alternatively employ time expander circuits arranged as shown in FIG. 3 but with the cams 32 rotating counterclockwise. The outputs of the respective expander circuits are applied to the receiving circuits and viewing screens 44–46 of the connected subscriber station sets.

From a consideration of the arrangement of FIG. 3, it should be apparent that the different time-compressed signals can be interleaved without time overlap if the different cams 32 are synchronized so that the reflective faces 31 perform their effective scanning or sweeping of the crossed light beams at the appropriate nonoverlapping times. Nevertheless, in a practical communication system, such as one employing Picturephone, it would not be feasible to synchronize the different cams, which are widely separated in subscriber stations that are in any event not connected to one another at the time in question. Therefore, it is necessary to permit the outputs of the different time compressors to have an initially arbitrary time-wise relationship and to align these different signals as desired at the switching terminals at which they converge in their travels.

A further modification of the embodiment of FIG. 1 to provide the occasional variation in delay necessary for the alignment function is shown in FIG. 5. Illustratively, a line 64 from the output of compressor 47 and a line 65 from the output of compressor 48 are connected to respective inputs of a coincidence gate 66. In the case of the multiplexing of 10 signals, a plurality of different coincidence gates would align 10 signals by operating upon them in pairs. When the signals overlap in time as shown by the curves 71 and 72, the conventional coincidence gate 66 generates an output signal, driving servo motor 67 to rotate reflector 68 to deflect the beam from laser 69 and vary the delay presented to the signal from line 64. The delay occurs between the transducer 13 and the modulation region in the acoustic modulator including crystal 12. The delay is varied in the sense appropriate to ensure that the signal at the output of buffer amplifier 70 does not overlap the signal in line 65 time-wise. That is, the signal at the output of buffer amplifier 70 occupies the time position shown by the curve 73. The relative alignment of the curves 71, 72 and 73 is shown in FIG. 6.

It should be clear to one skilled in the optical arts that, in addition to the uses described above, there are still further uses for a variable-delay modulator. For example, suppose the delay is varied rapidly by moving the light beam at a velocity that increases linearly with respect to time. The delay now varies quadratically with respect to time. The instantaneous phase of the beat detected by photo-detector 18 or photo-detector 19 is given by $$\phi=\int_0^t \left[\Omega-\frac{2\pi}{\Lambda}V(t)\right]dt \qquad (10)$$

where $V(t)$ is equal to $A \cdot t$ and A is the acceleration of the motion of the light beam. Since the effective frequency is the derivative of the instantaneous phase of the beat, the frequency of the beat varies linearly with time. Thus, the arrangement produces a "chirp" of the type useful for a chirp radar.

In all cases, the above-described arrangements are illustrative of a small number of the many possible specific embodiments that can represent applications of the invention. Numerous and varied other arrangements can readily be devised in accordance with these principles by those skilled in the art without departing from the spirit and scope of the invention.

What is claimed is:

1. A modulator comprising a medium in which an acoustic wave can be propagated, means for generating an acoustic wave in said medium, and means for applying two phase coherent light beams to said medium to be modulated by said acoustic wave in a scattering interaction, said applying means including means for directing said beams to align an unscattered portion of one of said beams with a scattered portion of the other of said beams.

2. A modulator according to claim 1 in which the means for generating an acoustic wave comprises a source of a signal-modulated electromagnetic wave and the light-beam applying means includes means for deflecting both light beams simultaneously to vary the time delay between generation of a portion of the acoustic wave and its participation in the scattering interaction.

3. A modulator according to claim 1 in which the light beam directing means comprises a prism shaped and adapted to provide substantially equal variations in path length for the two beams in response to a disturbance of said prism.

4. A modulator according to claim 1 in which the light beam applying means includes a lasser providing a beam and the light-beam-directing means comprises a prism shaped and adapted simultaneously to split the laser beam into the two beams to be modulated and to provide substantially equal variations in path length for the two beams in response to a disturbance of said prism.

5. A modulator according to claim 1 in which the light beam applying means includes a laser providing a beam and the light beam directing means comprises a Koester's double-image prism oriented and spaced from the acoustic medium to align the unscattered portion of one of the beams with the scattered portion of the other of the beams.

6. Apparatus for altering the time scale of a modulated electromagnetic wave, comprising a medium in which an acoustic wave can be propagated, means for generating a modulated acoustic wave in said medium in response to said modulated electromagnetic wave, a source of a monochromatic light beam, means for directing said light beam into said medium in two crossed components to provide with said acoustic wave a scattering interaction the locus of which moves along said medium at a substantially linear rate, said directing means providing an alignment of said crossed components in which a portion of one of said components is scattered substantially in the direction of an unscattered portion of the other component, and means for detecting the beat frequencies of the scattered and unscattered portions propagating in said direction, whereby the center frequency of the electromagnetic wave is a multiple of the center frequency of the detected beat frequencies.

7. A modulator according to claim 1 in which the light-beam applying means includes means for providing a diffraction angle of the light to achieve a selected bandwidth and in which the acoustic wave generating means includes means for providing a diffraction angle of the acoustic beam to achieve a selected efficiency of the device.

8. A modulator according to claim 7 in which the means for providing the diffraction angle of the acoustic beam provides a diffraction angle nearly equal to the diffraction angle of the light.

References Cited

UNITED STATES PATENTS

| | | | |
|---|---|---|---|
| 2,030,235 | 2/1936 | Walton | 350—150 |
| 2,155,661 | 4/1939 | Jeffree | 350—161 |

ROBERT L. GRIFFIN, Primary Examiner

A. J. MAYER, Assistant Examiner

U.S. Cl. X.R.

332—7.51; 350—150, 161